(12) United States Patent
Kim et al.

(10) Patent No.: US 11,975,500 B2
(45) Date of Patent: May 7, 2024

(54) METHOD FOR MANUFACTURING POLARIZING PLATE

(71) Applicant: LG CHEM, LTD., Seoul (KR)

(72) Inventors: Young Sik Kim, Daejeon (KR); Jin Yong Park, Daejeon (KR); Yeon Ok Jung, Daejeon (KR); Min Woo Hwang, Daejeon (KR); Jung Geun Kwon, Daejeon (KR); Yong Su Ju, Daejeon (KR); Chan Youn Kim, Daejeon (KR); Ji Hoon Park, Daejeon (KR); Seong Min Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 428 days.

(21) Appl. No.: 17/293,419

(22) PCT Filed: Feb. 11, 2020

(86) PCT No.: PCT/KR2020/001893
§ 371 (c)(1),
(2) Date: May 12, 2021

(87) PCT Pub. No.: WO2020/171458
PCT Pub. Date: Aug. 27, 2020

(65) Prior Publication Data
US 2021/0402722 A1    Dec. 30, 2021

(30) Foreign Application Priority Data

Feb. 19, 2019   (KR) .................. 10-2019-0019179

(51) Int. Cl.
*B29D 11/00*    (2006.01)
*G02B 5/30*    (2006.01)

(52) U.S. Cl.
CPC ...... *B29D 11/00644* (2013.01); *G02B 5/3016* (2013.01); *G02B 5/3075* (2013.01)

(58) Field of Classification Search
None
See application file for complete search history.

(56) References Cited

U.S. PATENT DOCUMENTS

| 8,338,823 B2 | 12/2012 | Kim et al. |
| 9,937,689 B2 | 4/2018 | Saito et al. |

(Continued)

FOREIGN PATENT DOCUMENTS

| IN | 107561619 A | 1/2018 |
| JP | 2006-307151 | 11/2006 |

(Continued)

OTHER PUBLICATIONS

Yamamoto Mika et al., "Single-layered retardation films with negative wavelength dispersion birefringence made from liquid-crystalline monomers", Journal of the Society for Information Display—SID, vol. 25, No. 7, Jul. 1, 2017, pp. 405-410, XP055894094.

*Primary Examiner* — Mohammad M Ameen
(74) *Attorney, Agent, or Firm* — Bryan Cave Leighton Paisner LLP

(57) ABSTRACT

Provided is a method for manufacturing a polarizing plate, comprising a step of irradiating an optical laminate with ultraviolet rays having an emission wavelength band of 380 nm to 410 nm. The optical laminate sequentially comprises a first base film, a first adhesive layer, a linear polarizer, a second adhesive layer, a second base film and a reverse dispersion liquid crystal layer. The first adhesive layer and the second adhesive layer each comprise a photosensitizer for initiating a curing reaction in a wavelength band of 350 nm to 410 nm, and the ultraviolet rays are irradiated on the first base film side of the optical laminate.

14 Claims, 1 Drawing Sheet

(56) References Cited

U.S. PATENT DOCUMENTS

| | | |
|---|---|---|
| 2010/0320494 A1 | 12/2010 | Kim et al. |
| 2014/0293420 A1* | 10/2014 | Ko ............... H10K 50/86 359/489.07 |
| 2014/0320960 A1* | 10/2014 | Saito ............. B32B 27/06 156/275.7 |
| 2015/0044479 A1 | 2/2015 | Motohashi et al. |
| 2016/0154157 A1 | 6/2016 | Cho et al. |
| 2017/0210915 A1 | 7/2017 | Lee et al. |

FOREIGN PATENT DOCUMENTS

| | | | |
|---|---|---|---|
| JP | 2008-065160 | | 3/2008 |
| JP | 2011-052161 | | 3/2011 |
| JP | 2011 052161 A | * | 3/2011 |
| JP | 2014206702 A | | 10/2014 |
| JP | 2014-215560 A | | 11/2014 |
| JP | 2014 215560 A | * | 11/2014 |
| JP | 2015163936 A | | 9/2015 |
| JP | 2016126346 A | | 7/2016 |
| JP | 2017-88591 A | | 5/2017 |
| JP | 2017-160313 A | | 9/2017 |
| JP | 2017-194571 A | | 10/2017 |
| JP | 2017193634 A | | 10/2017 |
| JP | 2018041079 A | | 3/2018 |
| JP | 2020-525837 A | | 8/2020 |
| KR | 20090122138 | | 11/2009 |
| KR | 10-1436441 | | 9/2014 |
| KR | 10-2014-0128222 | | 11/2014 |
| KR | 10-2016-0015181 | | 2/2016 |
| KR | 10-2016-0107954 A | | 9/2016 |
| KR | 10-2016-0117469 | | 10/2016 |
| KR | 1020170098702 A | | 8/2017 |
| KR | 10-2017-0117961 | | 10/2017 |
| TW | 2018-00235 | | 1/2018 |
| WO | 01/90808 A1 | | 11/2001 |
| WO | 2009/151095 A1 | | 12/2009 |
| WO | 2013-140472 | | 9/2013 |
| WO | 2014058042 A1 | | 4/2014 |
| WO | 2015030316 A1 | | 3/2015 |
| WO | 2015-118975 | | 8/2015 |
| WO | 2017/094253 A1 | | 6/2017 |
| WO | 2018021013 A1 | | 2/2018 |
| WO | 2018186472 A1 | | 10/2018 |
| WO | 2019/013516 A1 | | 1/2019 |

\* cited by examiner

[Figure 1]
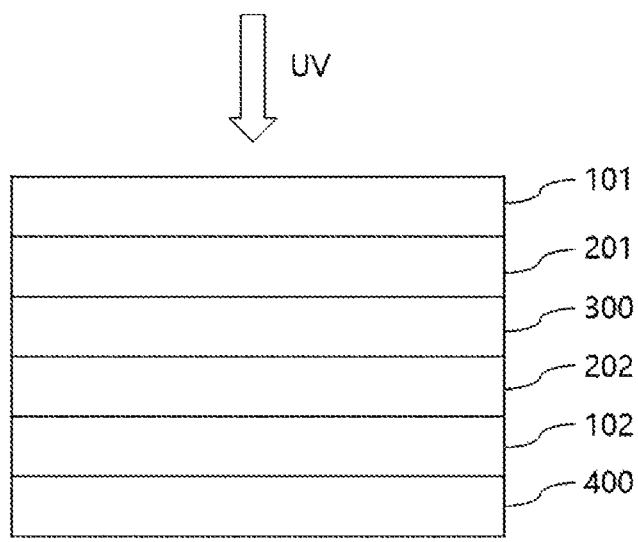
[Figure 2]
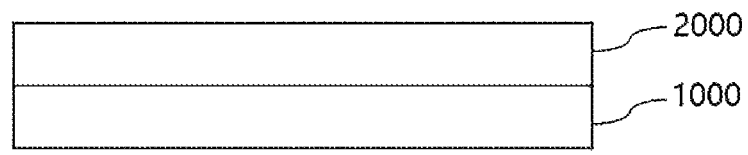

METHOD FOR MANUFACTURING POLARIZING PLATE

CROSS-REFERENCE TO RELATED APPLICATIONS

The present application is a National Stage Application of International Application No. PCT/KR2020/001893 filed on Feb. 11, 2020, which claims the benefit of priority to Korean Patent Application No. 10-2019-0019179 filed on Feb. 19, 2019, the disclosure of which is incorporated herein by reference in its entirety.

TECHNICAL FIELD

The present application relates to a method for manufacturing a polarizing plate.

BACKGROUND

OLED (organic light emitting device) panels have high external reflection due to electrode exposure, whereby polarizers are used for anti-reflection functions. The polarizing plate implementing anti-reflection functions basically requires linear and circular polarizers in the structure. At this time, since the panel black visual appreciation depends on the material characteristics of the circular polarizer, the selection of the circular polarizer is a very important factor in the polarizing plate.

For example, in order to implement the perfect black visual appreciation, the use of reverse dispersion materials is required so that the circular polarizer has a λ/4 phase difference at all wavelengths of visible light.

In attaching the reverse dispersion liquid crystal type polarizer to the linear polarizer, when an ultraviolet curable adhesive is used, it can be advantageous in terms of the water resistance of the polarizing plate, but the curing does not sufficiently occur by blocking the transmissive ultraviolet rays due to the inherent characteristics of the reverse dispersion liquid crystals, so that there is a problem that the adhesive force is lowered.

As an alternative, it can be considered to use a water-based adhesive, but when the water-based adhesive is used, there is a problem that it has weak water resistance and is vulnerable to high-humidity external environments. As another alternative, a method of attaching the reverse dispersion liquid crystal type circular polarizer to a general polarizing plate with a pressure-sensitive adhesive can be considered, but there is a disadvantage that the thickness becomes thick and the number of processes increases (Patent Document 1: Korean Laid-Open Patent Publication No. 2009-0122138).

DETAILED DESCRIPTION

Technical Problem

The present application provides a method for manufacturing a polarizing plate, which can exhibit excellent anti-reflection functions within a wide visible light range, can exhibit sufficient adhesive force between a base film and a linear polarizer, has excellent water resistance and is capable of thinning and rolling, and a use of the polarizing plate.

Technical Solution

The present application relates to a method for manufacturing a polarizing plate. FIG. 1 is an exemplary diagram illustrating the method. As shown in FIG. 1, the method can comprise a step of irradiating an optical laminate including a first base film (101), a first adhesive layer (201), a linear polarizer (300), a second adhesive layer (202), a second base film (102) and a reverse dispersion liquid crystal layer (400) sequentially with ultraviolet rays (UV).

In this specification, in order to distinguish objects before and after the ultraviolet rays are irradiated, an object comprising the first adhesive layer and the second adhesive layer in an uncured state before the ultraviolet ray irradiation can be referred to as an optical laminate, and an object comprising the first adhesive layer and the second adhesive layer in a cured state can be referred to as a polarizing plate. That is, the object in which the first adhesive layer and the second adhesive layer are cured by irradiating the optical laminate with ultraviolet rays can be referred to as a polarizing plate.

The reverse dispersion liquid crystal layer can have low transmittance for ultraviolet rays due to the inherent characteristics of the reverse dispersion liquid crystals. In one example, the second base film on which the reverse dispersion liquid crystal layer is formed can have lower transmittance at a wavelength of 400 nm, as compared to the first base film. According to the present application, the ultraviolet rays having a main emission wavelength band of 380 nm to 410 nm are irradiated in the direction of the first base film, and thus the ultraviolet rays are irradiated to the opposite side with higher transmittance in the wavelength band than the reverse dispersion liquid crystal layer, whereby it can be advantageous in terms of securing sufficient adhesive force between the base film and the linear polarizer because the first adhesive layer and the second adhesive layer can be cured.

Hereinafter, the method for manufacturing a polarizing plate of the present application will be described in detail.

The ultraviolet rays can be irradiated in the direction of the first base film in the optical laminate. The main emission wavelength band of the ultraviolet rays can be a wavelength band of 380 nm to 410 nm. In this specification, the fact that the main emission wavelength band is a wavelength band of 380 nm to 410 nm can mean that the energy of light emitted in the entire emission spectrum (200 nm to 450 nm) for the wavelength is 150 W (watt) or more in the wavelength band of the relevant range.

The first adhesive layer and the second adhesive layer can each comprise a photosensitizer to initiate a curing reaction in a wavelength band of 350 nm to 410 nm. In this specification, the fact that a photosensitizer initiates a curing reaction in a wavelength band of 350 nm to 410 nm can mean that in the entire absorption spectrum of the photosensitizer, it has at least one absorption maximum wavelength (peak) in the wavelength band of the relevant range.

In this specification, the terms, polarizer and polarizing plate, refer to objects that are distinguished from each other. The term polarizer means a film, sheet or element itself having a polarizing function, and the term polarizing plate means an object comprising the polarizer and another element laminated on one or both sides of the polarizer. Here, another element can be exemplified by a protective film of a polarizer, an antireflection film, a retardation film, a pressure-sensitive adhesive layer, an adhesive layer, a surface treatment layer, a liquid crystal layer, a retardation layer or a barrier film, and the like.

The linear polarizer can be an absorbing polarizer. In this specification, the absorbing polarizer means an element exhibiting selective transmission and absorption characteristics with respect to incident light. For example, the absorbing polarizer can transmit light that vibrates in one direction from incident light that vibrates in various directions, and absorb light that vibrates in the other directions.

In this specification, the linear polarizer means a case where the selectively transmitting light is linearly polarized light that vibrates in any one direction, and the selectively absorbing light is linearly polarized light that vibrates in a direction orthogonal to the vibration direction of the linearly polarized light.

The linear polarizer can be a polymer film comprising a dichroic material. The dichroic material can be iodine or a dichroic dye. As the polymer film, a polyvinyl alcohol-based film can be used. The dichroic material can be included in the polymer film in an oriented state.

In the optical laminate, the linear polarizer and the first base film can be attached via a first adhesive layer. At this time, one side of the first adhesive layer can contact the first base film and the other side can contact the linear polarizer.

In the optical laminate, the linear polarizer and the second base film can be attached via a second adhesive layer. At this time, one side of the second adhesive layer can contact the second base film and the other side can contact the linear polarizer.

The first adhesive layer and the second adhesive layer can be an ultraviolet curable adhesive. In this specification, the ultraviolet curable adhesive can mean an adhesive capable of exhibiting adhesiveness by initiating a curing reaction by irradiation of ultraviolet rays. In this specification, the ultraviolet rays can mean light having a wavelength in the range of about 380 nm to 410 nm. In one example, the first adhesive layer and the second adhesive layer can be cured through ultraviolet irradiation. In the present application, it is possible to secure excellent water resistance by using the ultraviolet curable adhesive instead of the water-based adhesive. Therefore, the polarizing plate manufactured according to the method of the present application can exhibit excellent durability even in high-humidity external environments.

As described above, the photosensitizer included in each of the first adhesive layer and the second adhesive layer can initiate a curing reaction in a wavelength band of 350 nm to 410 nm. That is, the photosensitizer can serve as a photoinitiator. Through this, the first adhesive layer and the second adhesive layer can be each cured in the wavelength band of 350 nm to 410 nm.

The photosensitizer absorbs light in the wavelength range of 350 nm to 410 nm, and is a kind of catalyst in a photochemical reaction. The photosensitizer can absorb the light having a predetermined wavelength to be in an exited state, and then cause a reaction on a substrate.

An example of the photosensitizer can include carbonyl compounds, organic sulfur compounds, persulfides, redox compounds, azo and diazo compounds, halogen compounds and photoreducing dyes, and the like, and more specifically, can include benzophenone derivatives such as 2,4-dichlorobenzophenone, methyl o-benzoylbenzoate, 4,4'-bis(dimethylamino)benzophenone and 4,4'-bis(diethylamino)benzophenone; thioxanthone derivatives such as 2-chlorothioxanthone and 2-isopropyl thioxanthone; anthraquinone derivatives such as 2-chloroanthraquinone and 2-methylanthraquinone, and the like.

The first adhesive layer and the second adhesive layer can each comprise an ultraviolet curable resin. The ultraviolet curable resin can include an epoxy-based resin or an acrylic resin. According to one example of the present application, an epoxy-based resin can be used as the ultraviolet curable resin.

The first adhesive layer and the second adhesive layer can each comprise the photosensitizer in a ratio within a range of 1 wt % to 5 wt %. If the content of the photosensitizer is too small, it may not be cured, whereas if it is too large, the photosensitizer can be precipitated, thereby resulting in poor appearance in the state of the polarizing plate and causing color change of the polarizing plate to be manufactured, and thus the content of the photosensitizer can be appropriately within the above range.

The thicknesses of the first adhesive layer and the second adhesive layer can be each in a range of 1 μm to 5 μm. If the thickness of the adhesive layer is too thin, the thickness of the coating surface can be uneven, thereby resulting in adhesive-uncoated areas and adhesive force deterioration in certain areas, whereas if it is too thick, the adhesive may not be sufficiently cured and can be vulnerable to durability, and thus the thicknesses of the first adhesive layer and the second adhesive layer can be appropriately in the above range.

As the first base film and/or the second base film, a plastic film can be used for rollable characteristics. As the plastic film, for example, PA (polyacrylate); COP (cyclo olefin polymer); PMMA (poly(methyl methacrylate)); PC (polycarbonate); PE (polyethylene); PP (polypropylene); PVA (polyvinyl alcohol); DAC (diacetyl cellulose); PES (polyethersulfone); PEEK (polyetheretherketone); PPS (polyphenylsulfone), PEI (polyetherimide); PEN (polyethylenenaphthalate); PET (polyethyleneterephtalate); PI (polyimide); PSF (polysulfone); PAR (polyarylate), and the like can be used.

The first base film and the second base film can each exhibit optical isotropy. In one example, absolute values of a planar phase difference value and a thickness direction phase difference value of the base film can be each 10 nm or less. As described below, the polarizing plate can prevent external light reflection of external light due to the λ/4 phase delay characteristics of the reverse dispersion liquid crystal layer. It is advantageous that the base film exhibits optical isotropy so as not to impair such performance.

In this specification, the planar phase difference (Rin) value and the thickness direction phase difference (Rth) value of the base film, the retardation layer, the liquid crystal layer, the retardation film or the like can be calculated by the following Equations 1 and 2, respectively.

$$Rin = d \times (nx - ny) \quad \text{Equation 1}$$

$$Rth = d \times (nz - ny) \quad \text{Equation 2}$$

In Equations 1 and 2, nx, ny and nz mean refractive indexes in the x-axis, y-axis and z-axis directions of the base film, the retardation layer, the liquid crystal layer, the retardation film or the like, respectively, and d means the thickness of the base film, the retardation layer, the liquid crystal layer, the retardation film or the like. The x-axis means the direction parallel to the in-plane slow axis, the y-axis means the direction parallel to the in-plane fast axis, and the z-axis means the thickness direction. The x and y axes can be perpendicular to each other in the plane. In this specification, while the Rin value, the Rth value and the refractive index are described, they mean the Rin value, the Rth value and the refractive index for light having a wavelength of about 550 nm, unless otherwise specified.

The first base film can have an ultraviolet blocking function. The first base film can comprise an ultraviolet absorber. When the first base film has an ultraviolet blocking function, it is possible to prevent deterioration of an element due to ultraviolet rays. When the first base film on the side irradiated with ultraviolet rays comprises an ultraviolet absorber, the light in the ultraviolet wavelength band can be blocked partly by the ultraviolet absorber, but as compared to irradiating the reverse dispersion liquid crystal layer side of the second base film with ultraviolet rays, it has higher transmittance for ultraviolet rays in the wavelength band of 380 nm to 410 nm, so that it can be advantageous in terms of curing of the first adhesive layer and the second adhesive layer.

The first base film can have transmittance of 65% or more at a wavelength of 400 nm. As the wavelength decreases, the transmittance decreases rapidly, which can be less than 10% at a wavelength of 380 nm. The upper limit of the transmittance of the first base film at a wavelength of 400 nm can be, for example, less than 90%. Such transmittance characteristics can be attributable to characteristics of an ultraviolet blocker to be described below.

The second base film on which the reverse dispersion liquid crystal layer is formed can have transmittance of less than 40% at a wavelength of 400 nm. As the wavelength decreases, the transmittance decreases rapidly, which can be less than 3% at a wavelength of 380 nm. These transmittance characteristics are attributable to the inherent characteristics of the reverse dispersion liquid crystal.

The thickness of the first base film and/or the second base film can be, for example, 10 μm to 100 μm. When the thickness of the base film is within the above range, it can be advantageous for the thinning of the polarizing plate and the implementation of rollable characteristics.

The reverse dispersion liquid crystal layer can be in contact with the opposite side on which the second adhesive layer of the second base film exists. In this specification, the reverse dispersion liquid crystal layer can mean a liquid crystal layer satisfying the following equation 3. In the case of using the reverse dispersion liquid crystal layer, the desired phase delay characteristics can be exhibited in a wide visible light range, so that it can be advantageous to exhibit antireflection performance in a wide visible light range.

$$R(450)/R(550) < R(550)/R(550) < R(650)/R(550) \quad \text{Equation 3}$$

In Equation 3, R (λ) is the planar phase difference value of the liquid crystal layer for a wavelength of λ nm.

The reverse dispersion liquid crystal layer can comprise a reverse dispersion liquid crystal compound. In this specification, the reverse dispersion liquid crystal compound can mean a liquid crystal compound in which the liquid crystal layer formed by curing the liquid crystal compound alone shows reverse dispersibility of Equation 3 above.

In one example, the liquid crystal compound can be a polymerizable liquid crystal compound. In this specification, the term "polymerizable liquid crystal compound" can mean a compound containing a site capable of exhibiting liquid crystallinity, for example, a mesogen skeleton or the like, and also containing one or more polymerizable functional groups. The polymerizable functional group can be, for example, an alkenyl group, an epoxy group, a carboxyl group, an acryloyl group, a methacryloyl group, an acryloyloxy group or a methacryloyloxy group, but is not limited thereto.

In this specification, while the wavelength dispersibility and phase difference values are described, they can mean wavelength dispersibility and phase difference values with respect to the liquid crystal layer formed by curing the liquid crystal compound in a state where the orientation is made on the xy plane, unless otherwise specified.

The R (450)/R (550) value of the reverse dispersion liquid crystal layer can be, for example, 0.99 or less. In one example, the R (450)/R (550) can be in a range of 0.6 to 0.99. The reverse dispersion liquid crystal layer can have an R (650)/R (550) value of 1.01 or more. In one example, the R (650)/R (550) value can be in the range of 1.01 to 1.30.

The liquid crystal compound having the R (450)/R (550) and/or R (650)/R (550) values is not particularly limited. In this field, liquid crystal compounds having R (450)/R (550) and/or R (650)/R (550) in the above ranges as liquid crystal compounds having reverse dispersibility are known, and such liquid crystal compounds can be selected and used.

The phase difference value of the reverse dispersion liquid crystal layer can be appropriately adjusted in consideration of the use that the polarizing plate is applied. The planar phase difference value of the reverse dispersion liquid crystal layer for a wavelength of 550 nm can be in a range of 100 nm to 200 nm, 100 nm to 180 nm, 100 nm to 150 nm or 130 nm to 150 nm.

The angle formed by the slow axis of the reverse dispersion liquid crystal layer and the absorption axis of the linear polarizer can be appropriately adjusted in consideration of the use to which the polarizer is applied. The angle formed by the slow axis of the reverse dispersion liquid crystal layer and the absorption axis of the linear polarizer can be in a range of 40 degrees to 50 degrees.

The optical laminate or the polarizing plate can further comprise a +C plate formed on one side of the reverse dispersion liquid crystal layer. In this specification, the +C plate can mean a retardation layer satisfying the refractive index relationship of Equation 4 below.

$$nx \approx ny < nz \quad \text{Equation 4}$$

In Equation 4, nx, ny and nz mean refractive indexes for a wavelength of 550 nm in the x-axis, y-axis, and z-axis directions of the retardation layer, respectively, and the definitions of the directions of the x-axis, y-axis and z-axis are as described above.

The polarizing plate manufactured according to the method of the present application can be applied, for example, to rollable OLED panels. The rollable OLED panel can exhibit the same phase difference as a −C plate due to the characteristics of the base material, and thus when the optical laminate further comprises a +C plate, it can compensate for the phase difference of the −C plate, so that it can be more advantageous for improving visual appreciation characteristics.

The thickness direction phase difference value of the +C plate can be, for example, more than 0 nm. The thickness direction phase difference value of the +C plate can be specifically in a range of 90 nm to 110 nm. It can be more advantageous to improve the visual appreciation characteristics of the OLED panel within such a thickness direction phase difference value range.

As described above, the ultraviolet light can be irradiated to the first base film side of the optical laminate. When the ultraviolet rays are irradiated to the second base film side where the reverse dispersion liquid crystal layer is present, most of the light in the ultraviolet long wavelength band is blocked by the reverse dispersion liquid crystal layer so that the adhesive is not cured, and even if it is cured by increasing the ultraviolet intensity, appearance wrinkles are severely generated, whereby there is a problem of difficult commercialization.

The wavelength of the ultraviolet rays irradiated on the optical laminate can be in the range of 380 nm to 410 nm. When the ultraviolet wavelength is less than the above range, the first base film and the second base film block most of the ultraviolet rays, whereby the initiator does not participate in the curing reaction, and when it exceeds the above range, the wavelength light is absorbed into the films as the thermal energy to be capable of applying physical deformation thereto. Therefore, it can be preferable that the ultraviolet wavelength band is adjusted within the above range.

The light quantity of ultraviolet rays irradiated on the optical laminate can be in a range of 200 mJ to 400 mJ or 250 mJ to 400 mJ. When the light quantity of ultraviolet rays is too small, the curing may not occur sufficiently, and when the light quantity of ultraviolet rays is too large, physical deformation is caused in the polarizing plate and wrinkles are severely generated in appearance, whereby the commercialization can be difficult. Therefore, it can be preferable that the light quantity of ultraviolet rays is adjusted within the above range.

The method for manufacturing a polarizing plate of the present application can further comprise a step of irradiating the optical laminate with ultraviolet rays and then forming a pressure-sensitive adhesive layer on the reverse dispersion liquid crystal layer side. The pressure-sensitive adhesive layer can perform a function of attaching a polarizing plate to an OLED panel. As the pressure-sensitive adhesive layer, a known pressure-sensitive adhesive such as an acryl-based pressure-sensitive adhesive, a silicone-based pressure-sensitive adhesive, a rubber-based pressure-sensitive adhesive and a urethane pressure-sensitive adhesive can be used without any particular limitation.

The polarizing plate manufactured by the manufacturing method can have excellent water resistance. In one example, the polarizing plate can have an adhesive force of 1N or more as immediately measured after submerging it at a temperature of 60° C. in water for 6 hours and then taking it out. In this specification, the term "immediately" can mean within about 3 minutes.

The polarizing plate can further comprise a surface treatment layer. The surface treatment layer can be located on the opposite side where the linear polarizer of the first base film exists. The surface treatment layer can include an anti-fog layer, a self-healing layer, an anti-reflection layer, an anti-finger layer, an anti-fouling layer, an anti-glare layer, a mirror layer or a hardness enhancement layer. In the art, the hardness enhancing layer is also commonly referred to as a "hard coating layer." The material, the formation method, the physical properties, and the like of the surface treatment layer are not particularly limited and the contents known in the art can be applied.

The polarizing plate can further comprise a barrier film. The barrier film can be located on the opposite side where the second base film of the reverse dispersion liquid crystal layer exists. The barrier film can comprise a third base film and a barrier layer laminated on the third base film. The reverse dispersion liquid crystal layer and the barrier film can be attached via a pressure-sensitive adhesive layer. When the polarizing plate further comprises a barrier film, it can have excellent barrier performance against external environments such as moisture.

The third base film can have a water vapor transmission rate in a range of 1 g/m²·day to 100 g/m²·day. As the third base film, the first and second base films as mentioned above can be used. In one specific example, an acryl-based film or a COP-based film can be used as the third base film. The use of such a base film can be advantageous in terms of exhibiting the water vapor transmission rate within the above range.

As the barrier film is formed in a multilayer structure in which a first barrier layer and a second barrier layer are laminated, it can improve barrier performance against external environments such as moisture. In one example, the water vapor transmission rate of the first barrier layer and the second barrier layer can be $10^{-4}$ g/m²·day to $10^{-6}$ g/m²·day. The moisture vapor transmission rate can be a value measured in a state where the first barrier layer and the second barrier layer are laminated. When the water vapor transmission rate of the first and second barrier layers satisfies the above range, it is possible to effectively protect an OLED element from moisture. When the water vapor transmission rate exceeds the above range, the moisture can penetrate into the OLED element to cause damage to the OLED element, thereby causing deteriorated black spots.

The first barrier layer and the second barrier layer can be each an inorganic thin film layer. The inorganic thin film layer can comprise, for example, at least one inorganic compound selected from the group consisting of oxides, nitrides, hydrides and composite compounds. The element constituting the inorganic compound can be exemplified by silicon (Si), nitrogen (N), aluminum (Al), magnesium (Mg), calcium (Ca), potassium (K), zinc (Zn), tin (Sn), nickel (Ni), sodium (Na), boron (B), titanium (Ti), lead (Pb), zirconium (Zr) or yttrium (Y), and the like.

In one example, the first and second barrier layers can each comprise a SiOxNy compound. The SiOxNy compound can be suitable as a material such that the first barrier layer and the second barrier layer exhibit a water vapor transmission rate within the above range. In SiOxNy, x and y are x+y=1, which can satisfy 0≤x≤1 or 0≤y≤1.

The first and second barrier layers can each comprise a SiOxNy compound as a main component. For example, the first and second barrier layers can each comprise a SiOxNy compound in a ratio of 80 wt % or more, 85 wt % or more, 90 wt % or more, or 95 wt % or more.

In one example, the SiOxNy compound can be a polysilazane. The polysilazane is a kind of silicone compound, which can mean a polymer having a skeleton of Si—N bonds. Specifically, the polysilazane can be a polymer comprising "—(SiR$_1$R$_2$—NR$_3$)—" as a repeating unit. The R$_1$, R$_2$ and R$_3$ can be each independently a hydrogen atom, an oxygen atom or an organic substituent. In one example, in the polysilazane, one or more of R$_1$, R$_2$ and R$_3$ can comprise an oxygen atom. In one example, the first and second barrier layers can each comprise a SiOxNy compound, which is subjected to modification treatment, for example, plasma treatment, as described below.

The first barrier layer and the second barrier layer can each have a thickness in a range of 50 nm to 200 nm. When the thicknesses of the first barrier layer and the second barrier layer are within the above range, it can be advantageous to implement water vapor transmission rate within the above range, thinning of the polarizing plate, and rollable characteristics.

The present application relates to a use of the polarizing plate. In one example, the polarizer can be applied to an organic light emitting display device.

FIG. 2 illustratively shows an organic light emitting display device to which the polarizing plate is applied. As shown in FIG. 2, the organic light emitting display device can comprise an organic light emitting display panel (1000) and the polarizing plate (2000) arranged on one side of the organic light emitting display panel (1000). At this time, the reverse dispersion liquid crystal layer can be arranged closer to the organic light emitting display panel as compared to the linear polarizer of the polarizing plate.

The organic light emitting display panel can comprise a base substrate, a lower electrode, a light emitting layer including an organic material, and an upper electrode. If necessary, an encapsulation substrate can be further formed on the upper electrode. In the lower electrode and the upper electrode, one can be an anode and the other can be a cathode. The anode is an electrode to which holes are injected, which can be made of a conductive material having a high work function, and the cathode is an electrode to which electrons are injected, which can be made of a conductive material having a low work function. In the lower electrode and the upper electrode, at least one can be made of a transparent conductive material through which the emitted light can be emitted to the outside, in which the material can be, for example, ITO (indium tin oxide) or IZO (indium zinc oxide). The organic light emitting layer can comprise an organic material capable of emitting light when a voltage has been applied to the lower electrode and the upper electrode.

Sub-layers can be further included between the lower electrode and the organic light emitting layer and between the upper electrode and the organic light emitting layer. The sub-layer can include a hole transporting layer, a hole injecting layer, an electron injecting layer and/or an electron transporting layer for balancing electrons and holes, but is not limited thereto. The encapsulation substrate can be made of glass, a metal and/or a polymer, and can encapsulate the lower electrode layer, the organic light emitting layer and the upper electrode layer to prevent moisture and/or oxygen from being introduced from the outside.

The polarizing plate can be arranged on the side where light is emitted from the organic light emitting display panel. For example, in the case of a bottom emission structure in which light is emitted toward the base substrate, it can be arranged outside the base substrate, and in the case of a top emission structure in which light is emitted toward the encapsulation substrate, it can be arranged outside the encapsulation substrate.

The polarizing plate manufactured according to the method of the present application can exhibit excellent anti-reflection functions within a wide visible light range, can exhibit sufficient adhesive force between the base film and the linear polarizer, has excellent water resistance, and can be thinned and rolled. Such a polarizing plate can be applied to an organic light emitting display device, thereby improving black visual appreciation, improving durability, miniaturizing the device, and implementing a rollable device.

Advantageous Effects

The present application provides a method for manufacturing a polarizing plate, which can exhibit excellent anti-reflection functions within a wide visible light range, can exhibit sufficient adhesive force between a base film and a linear polarizer, has excellent water resistance and is capable of thinning and rolling. The polarizing plate can be applied to an organic light emitting display device, thereby improving black visual appreciation, improving durability, miniaturizing the device, and implementing a rollable device.

BRIEF DESCRIPTION OF DRAWINGS

FIG. 1 is a diagram for explaining a method for manufacturing a polarizing plate of the present application.

FIG. 2 illustratively shows an organic light emitting display device.

EXAMPLES

Hereinafter, the present application will be described in detail through examples according to the present application and comparative examples not according to the present application, but the scope of the present application is not limited to the examples given below.

Example 1

A PVA-based linear polarizer was manufactured by a wet stretching method (using the product name M6000L base material from Nippon Gohsei).

A first adhesive layer having a thickness of 2 μm in an uncured state was formed on one side of a first base film (UZ TAC, Fuji product) having a thickness of 60 μm. The first base film comprises an ultraviolet absorber and has transmittance of about 77% at a wavelength of 400 nm and transmittance of about 4% at a wavelength of 380 nm. The first adhesive layer comprises a photosensitizer (DETX-S manufacturer: IHT), which initiates a curing reaction in a wavelength band of 350 nm to 410 nm to an epoxy-based UV curable resin, in an amount of 2 wt %.

Reverse dispersion liquid crystals (LG Chemical) were coated on one side of a second base film (Zero Retardation TAC, Konica product) having a thickness of 40 μm to form a reverse dispersion liquid crystal layer having a planar phase difference value of 142 nm for a wavelength of 550 nm. The second base film on which the reverse dispersion liquid crystal layer has been formed has transmittance of about 27% at a wavelength of 400 nm and transmittance of about 0.7% at a wavelength of 380 nm. A second adhesive layer having a thickness of 2 μm in an uncured state was formed on the opposite side of the second base film on which the reverse dispersion liquid crystal layer was formed. The second adhesive layer comprises a photosensitizer (DETX-S manufacturer: IHT), which initiates a curing reaction in a wavelength band of 350 nm to 410 nm to an epoxy-based UV curable resin, in an amount of 2 wt %.

The first base film was attached to one side of the linear polarizer via the first adhesive layer. The second base film on which the reverse dispersion liquid crystal layer was formed was attached to the side of the linear polarizer to which the first base film was not attached via the second adhesive layer. At this time, they were attached such that the angle formed by the light absorption axis of the linear polarizer and the slow axis of the reverse dispersion liquid crystal layer was 45 degrees.

Through the above process, an optical laminate comprising the first base film, the first adhesive layer, the linear polarizer, the second adhesive layer, the second base film and the reverse dispersion liquid crystal layer sequentially was provided. A polarizing plate was manufactured by irradiating the first base film side of the optical laminate with ultraviolet rays having a main emission wavelength of 380 nm to 410 nm at a light quantity of 250 mJ by using ultraviolet light emitting equipment (electrodeless type UV curing machine) and curing the first adhesive layer and the second adhesive layer.

Comparative Example 1

A polarizing plate was manufactured in the same manner as in Example 1, except that the first adhesive layer and the second adhesive layer were cured by the following method. With regard to the first adhesive layer and the second adhesive layer of Comparative Example 1, adhesive layers having a thickness of 100 nm in an uncured state were formed by using a water-based adhesive (product name: Z3, manufacturer: LG Chemical) containing a polyvinyl alcohol resin (there was no photosensitizer in the water-based adhesive), and cured by a thermosetting method (90° C., 2 minutes).

Comparative Example 2

A polarizing plate was manufactured in the same manner as in Example 1, except that the ultraviolet rays were irradiated to the reverse dispersion liquid crystal layer side instead of the first base film side in Example 1.

Comparative Example 3

A polarizing plate was manufactured in the same manner as in Example 1, except that the ultraviolet rays were irradiated to the reverse dispersion liquid crystal layer side instead of the first base film side in Example 1, and the light quantity of ultraviolet rays was changed to 900 mJ.

Measurement Example 1. Adhesive Force Measurement

The manufactured polarizing plate sample was cut to a size of 20 mm×150 mm and the surface to be peeled is placed down and attached to the peeling machine substrate without foaming with a double-sided tape, and then the film opposite to the PVA was peeled off by 90 degrees at a rate of 300 mm/min to measure the adhesive force (unit N/20 mm). The adhesive force measurement equipment was a TA.XT texture analyzer. In Table 1, the initial adhesive force means the adhesive force measured at a temperature of 25° C.

Evaluation Example 1. Water Resistance Evaluation

The manufactured polarizing plate was submerged at 60° C. in water for 6 hours and then taken out, and the adhesive force was immediately measured to evaluate water resistance.

Evaluation Example 2. Evaluation of Curing Degree

For the manufactured polarizing plate, the cured adhesive surface was rubbed by hand, and the curing degree was evaluated based on the following criteria.
- ◎: instant curing (state where adhesive is completely cured and solidified)
- Δ: incomplete curing (state where adhesive is not completely cured and sticky)
- X: uncured (state where adhesive is not cured and flows down into the liquid)

TABLE 1

| Classification | | Example 1 | Comparative Example 1 | Comparative Example 2 | Comparative Example 3 |
|---|---|---|---|---|---|
| Curing method | | UV curing | Thermosetting | UV curing | UV curing |
| Adhesive | | UV adhesive | Water-based adhesive | UV adhesive | UV adhesive |
| UV light quantity | | 250 mJ | — | 250 mJ | 900 mJ |
| UV irradiation surface | | Upper base material (UZ) | — | Lower base material (ZRT surface) | Lower base material (ZRT surface) |
| Curing degree | | ◎ | ◎ | X | Δ |
| Adhesive force (Initial) | Top (UZ surface) | 3.0 | 2.7 | Not measured due to uncured | 0.2 |
| | Bottom (ZRT surface) | 3.8 | 3.6 | | 0.3 |
| Adhesive force (Water resistance) | Top (UZ surface) | 4.8 | 0.3 | — | — |
| | Bottom (ZRT surface) | 5.7 | 0.4 | — | — |

As a result of the evaluation, in both of the UV adhesion and the water-based adhesion for Example 1 and Comparative Example 1, the initial adhesive force is in the same level as 1N or more, but in the water resistance evaluation, the adhesive force of Comparative Example 1 is reduced to less than 1N, so that it can be seen that it is vulnerable to water resistance.

With respect to Example 1 and Comparative Example 2, the bottom base material surface (ZRT+liquid crystal) of Comparative Example 2 has been irradiated with UV rays and the adhesive has not been sufficiently cured due to the low transmittance of the bottom base material surface in the wavelength range of 400 nm or less as compared to the top base material surface, and as shown in Comparative Example 3, even if the light quantity of UV rays is increased 3 times or more as compared to Example 1, it can be seen that the adhesive force is reduced due to incomplete curing.

| Explanation of Reference Numerals | |
|---|---|
| 101: first base film | 102: second base film |
| 201: first adhesive layer | 202: second adhesive layer |
| 300: linear polarizer | 400: reverse dispersion liquid crystal layer |
| 1000: organic light emitting display panel | 2000: polarizing plate |

The invention claimed is:

1. A method for manufacturing a polarizing plate, comprising a step of irradiating an optical laminate with ultraviolet rays having an emission wavelength band of 380 nm to 410 nm, wherein:
   the optical laminate sequentially comprises a first base film, a first adhesive layer, a linear polarizer, a second adhesive layer, a second base film and a reverse dispersion liquid crystal layer;
   the first adhesive layer and the second adhesive layer each comprise a photosensitizer for initiating a curing reaction in a wavelength band of 350 nm to 410 nm;
   the first base film comprises an ultraviolet absorber and the second base film does not include the ultraviolet absorber; and
   the ultraviolet rays are irradiated on the first base film side of the optical laminate.

2. The method according to claim 1, wherein one side of the first adhesive layer is in contact with the first base film and the other side of the first adhesive layer is in contact with the linear polarizer.

3. The method according to claim 1, wherein one side of the second adhesive layer is in contact with the second base film and the other side of the second adhesive layer is in contact with the linear polarizer.

4. The method according to claim 1, wherein the photosensitizer absorbs light in a wavelength band of 350 nm to 410 nm.

5. The method according to claim 1, wherein the first adhesive layer and the second adhesive layer each comprise an ultraviolet curable resin, and the photosensitizer is present in a ratio within a range of 1 wt % to 5 wt %.

6. The method according to claim 1, wherein the first adhesive layer and the second adhesive layer are cured by irradiation with the ultraviolet rays.

7. The method according to claim 1, wherein the first base film has transmittance of 65% or more at a wavelength of 400 nm.

8. The method according to claim 1, wherein the first base film has transmittance of less than 10% at a wavelength of 380 nm.

9. The method according to claim 1, wherein the second base film, on which the reverse dispersion liquid crystal layer is formed, has transmittance of less than 40% at a wavelength of 400 nm.

10. The method according to claim 1, wherein the second base film, on which the reverse dispersion liquid crystal layer is formed, has transmittance of less than 3% at a wavelength of 380 nm.

11. The method according to claim 1, wherein the polarizing plate further comprises a +C plate formed on one side of the reverse dispersion liquid crystal layer.

12. The method according to claim 1, wherein the light quantity of the ultraviolet rays irradiated on the optical laminate is in a range of 200 mJ to 400 mJ.

13. The method according to claim 1, further comprising a step of forming a pressure-sensitive adhesive layer on the reverse dispersion liquid crystal layer side after irradiating the optical laminate with ultraviolet rays.

14. The method according to claim 1, wherein the polarizing plate manufactured by the method has an adhesive force of 1N or more as immediately measured after submerging it in water at a temperature of 60° C. for 6 hours and then taking it out.

* * * * *